United States Patent [19]

Matty et al.

[11] 4,095,153

[45] June 13, 1978

[54] TRANSIT VEHICLE ELECTRICAL BRAKE CONTROL APPARATUS AND METHOD

[75] Inventors: Thomas C. Matty, North Huntingdon; James H. Franz, Jr., Murrysville, both of Pa.

[73] Assignee: Westinghouse Electric Corp., Pittsburgh, Pa.

[21] Appl. No.: 709,684

[22] Filed: Jul. 29, 1976

[51] Int. Cl.² ............................................. H02P 3/14
[52] U.S. Cl. .................................. 318/376; 318/375; 318/373; 318/379
[58] Field of Search ............... 318/364, 373, 375, 376, 318/379, 380, 381

[56] References Cited

U.S. PATENT DOCUMENTS

| 3,271,649 | 9/1966 | Juergensen | 318/376 |
| 3,657,625 | 4/1972 | Miller et al. | 318/376 |
| 3,812,411 | 5/1974 | Johnson et al. | 318/376 |

Primary Examiner—Gene Z. Rubinson
Assistant Examiner—Eugene S. Indyk
Attorney, Agent, or Firm—R. G. Brodahl

[57] ABSTRACT

There is disclosed a programmed microprocessor control apparatus and method for determining the electric brake current build-up for regenerative braking effort with a series motor. The microprocessor program determines the current build-up by controlling the chopper operative with the electric motor of a transit vehicle.

11 Claims, 9 Drawing Figures

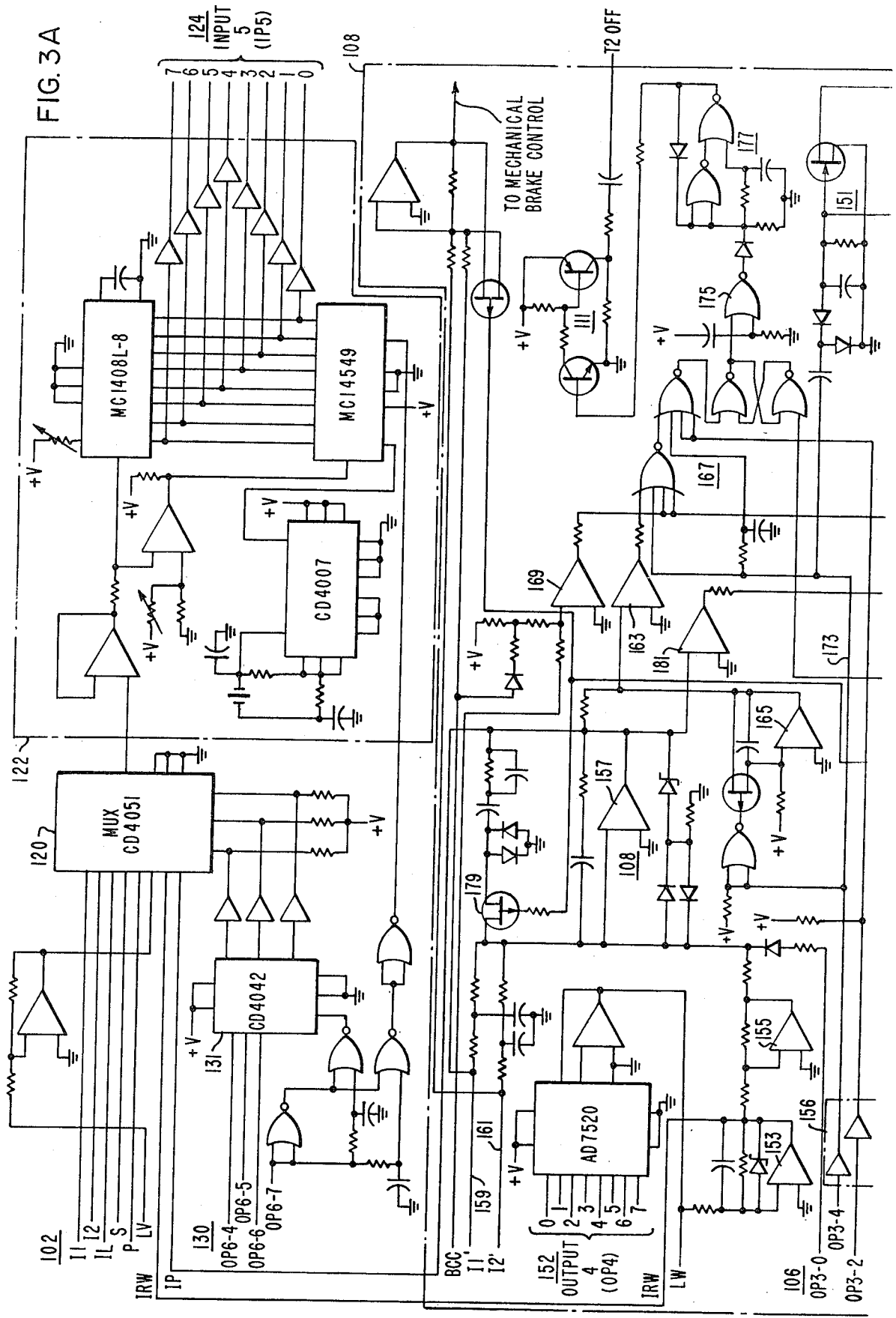

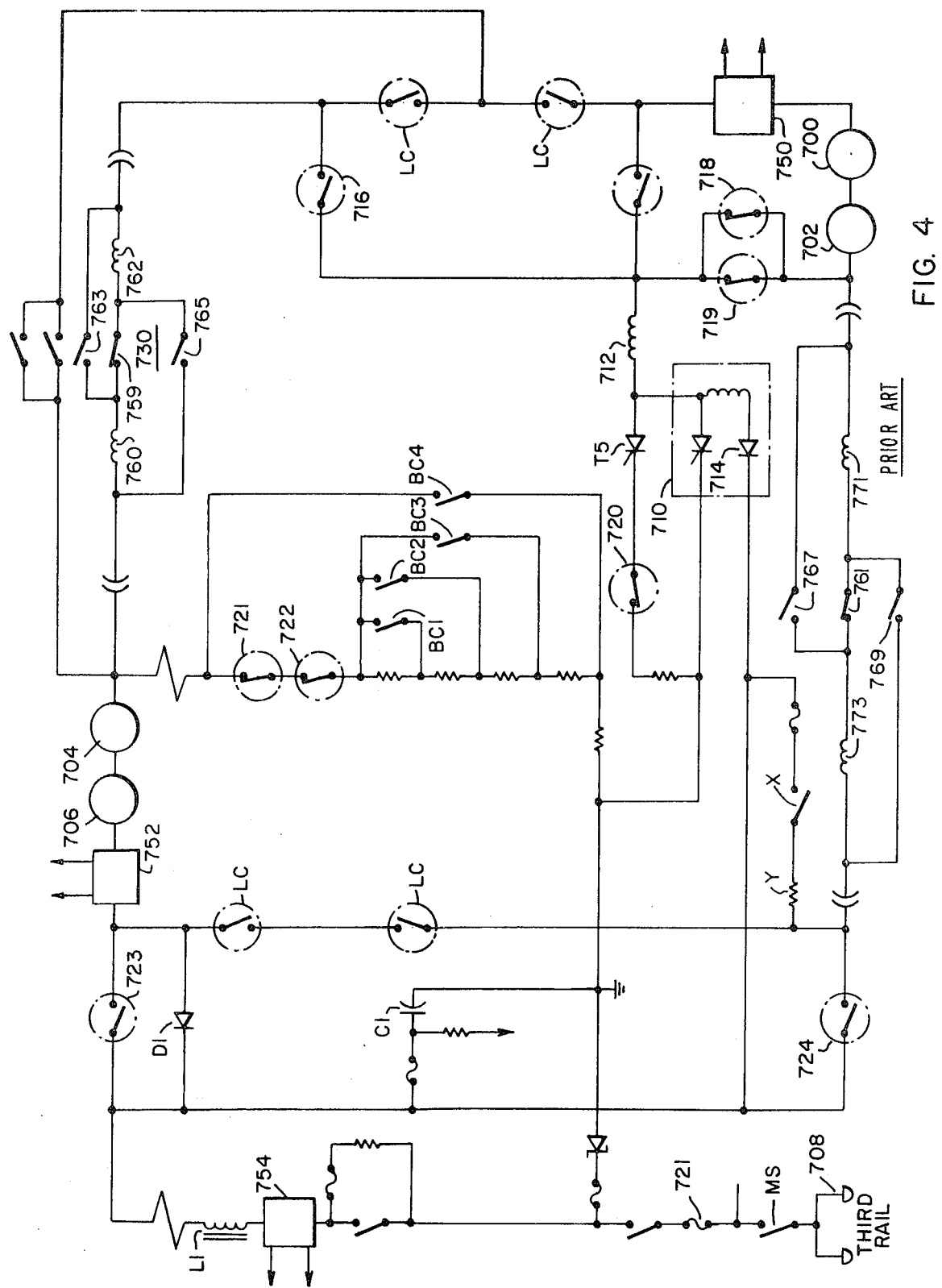

TRANSIT VEHICLE ELECTRICAL BRAKE CONTROL APPARATUS AND METHOD

CROSS REFERENCE TO RELATED APPLICATIONS

The present application is related to the following concurrently filed patent applications which are assigned to the same assignee as the present application; and the respective disclosures of which are incorporated herein by reference:

Ser. No. 709,687, which was filed on July 29, 1976 by J. H. Franz and entitled Transit Vehicle Chopper Control Apparatus And Method;

Ser. No. 709,686, which was filed on July 29, 1976 by L. W. Anderson, J. H. Franz and T. C. Matty and entitled Transit Vehicle Motor Operation Control Apparatus And Method;

Ser. No. 709,685, which was filed on July 29, 1976 by L. W. Anderson and J. H. Franz and entitled Transit Vehicle Generated Voltage Control Apparatus And Method; and Ser. No. 709,821, which was filed on July 29, 1976 by T. C. Matty and entitled Transit Vehicle Motor Effort Control Apparatus And Method.

BACKGROUND OF THE INVENTION

The present invention relates to the application of thyristor chopper apparatus for determining the propulsion power and electric brake operations of a transit vehicle having series propulsion motors, and more particularly to control apparatus including a microprocessor that is programmed for the desired control of such thyristor chopper apparatus.

Direct current power has been supplied to the series propulsion motors of a transit vehicle with a thyristor chopper, such as disclosed in U.S. Pat. No. 3,530,503 of H. C. Appelo et al., for controlling the acceleration and speed of the vehicle by turning the propulsion motor current ON and OFF in a predetermined pattern. The thyristor chopper can provide either regenerative braking or dynamic braking when braking is desired.

In an article entitled Automatic Train Control Concepts Are Implemented By Modern Equipment published in the Westinghouse Engineer for September 1972 at pages 145 to 151, and in an article entitled Propulsion Control For Passenger Trains Provides High Speed Service published in the Westinghouse Engineer for September 1970 at pages 143 to 149, there is described the operation of the P signal for controlling all powered vehicles in a train to contribute the same amount of propulsion or braking effort.

In an article entitled Alternative Systems For Rapid Transit Propulsion And Electrical Braking, published in the Westinghouse Engineer for March, 1973, at pages 34–41, there is described a thyristor chopper control system for propulsion and electrical braking of transit vehicles. The thyristor chopper provides a propulsion system that is superior in smoothness and ease of maintaining a given speed, which latter feature is desired for automatic train control. Moreover, the thyristor system makes regenerative braking practical because the response is fast enough to continuously match regenerated voltage to line voltage, and that matching prevents excursions in braking current and torque due to sudden transients in line voltage. The reduction in power consumption that results from regenerative braking can be significant, but another advantage is in relation to minimizing heat input to tunnels otherwise caused by dynamic braking.

The use of presently available microprocessor devices, such as the Intel 8080 family of devices, is described in a published article entitled Microprocessors - Designers Gain New Freedom As Options Multiply, in Electronics Magazine for Apr. 15, 1976 at page 78 and in a published article entitled Is There A High-Level Language In Your Microcomputer's Future? in EDN Magazine for May 20, 1976 at page 62.

SUMMARY OF THE INVENTION

A programmed microprocessor apparatus operates after the brake mode of operation is selected to establish a first upper motor current limit and controls the chopper operative with the vehicle motor to increase the motor current until the actual motor current is greater than the upper limit, and then the microprocessor apparatus establishes a second lower current limit and permits the desired brake effort current request to determine the motor current until the actual motor current goes below this second lower limit, when the microprocessor apparatus reestablishes the first upper motor current limit. This operation continues to be repeated until the desired brake effort current request assumes complete control of the motor current determination.

BRIEF DESCRIPTION OF THE DRAWINGS

FIGS. 3A and 3B illustrate schematically the provided interface of the present control apparatus;

FIG. 4 illustrates schematically a prior art motor operation control apparatus;

DESCRIPTION OF A PREFERRED EMBODIMENT

Figure 1:
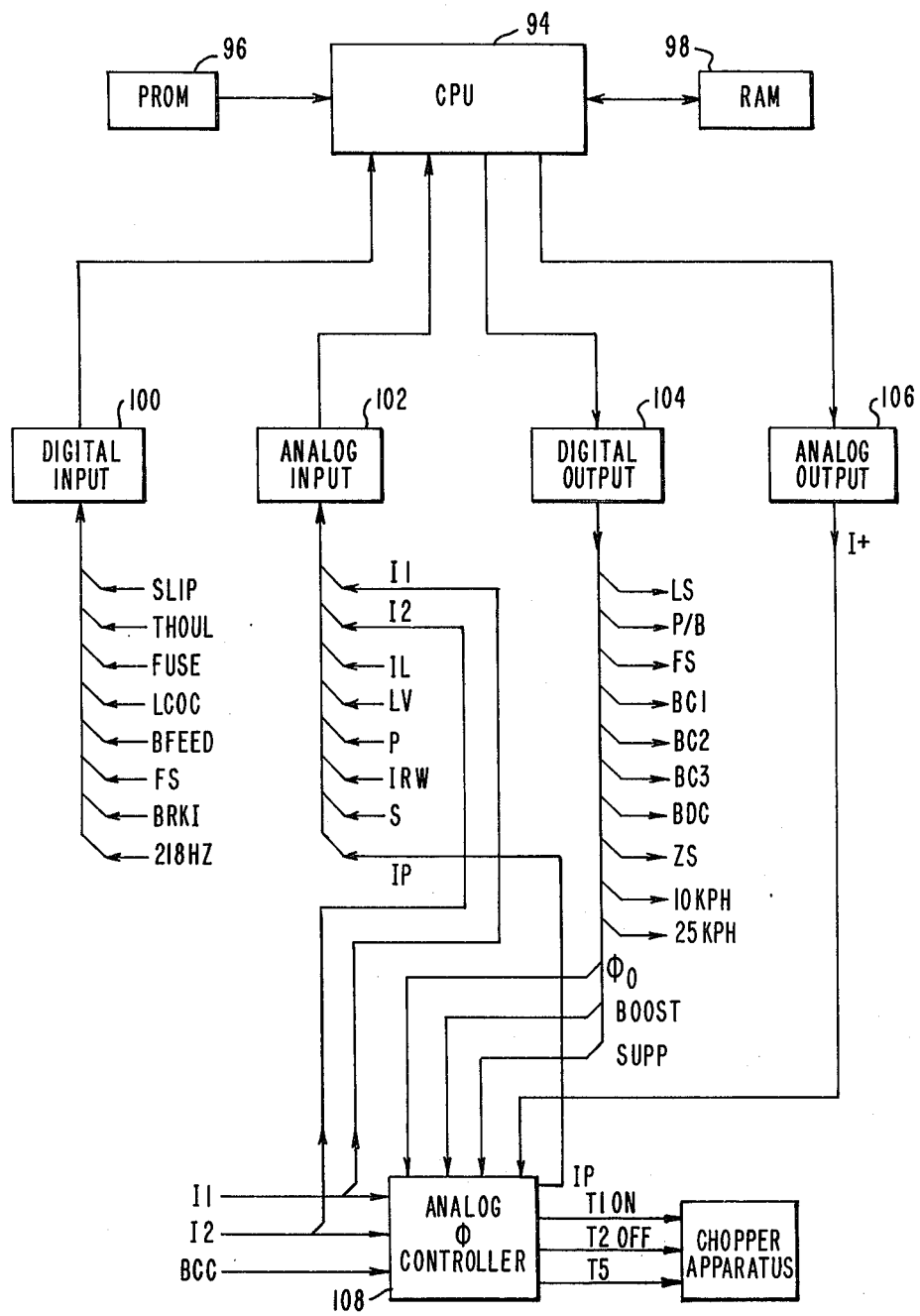
FIG. 1 shows a functional showing of the present control apparatus in relation to the input signals and the output signals operative with the control apparatus.

In FIG. 1 there is shown a functional illustration of the present control apparatus in relation to the input signals and the output signals operative therewith, and including a CPU microprocessor 94 operative with a PROM programmable memory 96 and a scratch pad RAM random access memory 98 used for intermediate storage. The application program, in accordance with the program listing included in the Appendix, is stored in the programmable memory 96. The microprocessor 94 can be an INTEL 8080, the random access memory 98 can be an INTEL 8108, and the programmable memory 96 can be an INTEL 1702 programmable read only memory, which items are currently available in the open marketplace. There are four illustrated categories of input and output signals relative to the processor controlled operation of a transit vehicle. The digital input signals are supplied through digital input 100 from the transit vehicle and include the slip slide signal SLIP, the thyristor temperature sensor thermal overload signal THOUL, the effective value of the line filter capacitor as indicated by the fuse counter signal FUSE, the power circuit condition indication signal LCOC, the power and brake feedback signal BFEED, the field shunt feedback signal FS, the brake status signal BRKI and the clock signal 218 Hz. The analog input signals are supplied through analog input 102 and include the first propulsion motor leg current I1, the second propulsion motor leg current I2, the line current IL, the line voltage LV, the primary power request or brake request control signal P, the air pressure in the vehicle support bag members providing load weighed current request signal IRW, the analog phase signal IP and the vehicle actual speed signal S1. The digital output signals are supplied through digital output 104 to the controlled transit vehicle and include the line switch control signal LS, the power brake mode control signal P/B, the field shunt control signal FS, the first braking resistor control signal BC1, the second braking resistor control signal BC2, the third braking resistor control signal BC3, the zero ohm field shunt control signal BDC, the 10 kilometer per hour signal 10 KPH, the 25 kilometer per hour signal 25 KPH, the phase zero control signal $\phi_o$, the timing signal BOOST, the ON suppress control signal SUPP and the zero speed signal ZS. The analog output current request signal I+ is supplied through analog output 106 going to an analog phase controller 108 operative to supply the control signal ON to fire the chopper thyristor T1, the control signal OFF to fire the commutating chopper thyristor T3, the control signal T5 for the T5 thyristor in the propulsion motor control chopper apparatus and the analog phase indication signal IP going to analog input 102. The time period associated with turning the chopper ON and OFF is at a constant frequency of 218 Hz, that defines the clock time interval for the program cycle and for checking the process operation. During each of the 218 time intervals per second, the program cycle operates through the application program. It was necessary in the prior art for some of the input signals to be filtered to slow down the effects of noise transients and the like, but the computer program now samples the input signals 218 times every second, so if desired each signal can be checked during each program cycle and if the signal stays the same as it was before the proper response can be provided. By sampling all the input signals every program cycle and by addressing every output signal every program cycle, if noise transients are received, their effect can be minimized or eliminated. For the output signals, a correct output can be given 5 milliseconds later, and faster than the power response time of the propulsion motors. For the input signals, digital filtering by comparison with old data can eliminate transient effects.

The train control system operative with each vehicle provides a P signal which selects a desired propulsion effort and this signal goes from 0 to 100 milliamps and establishes how much propulsion power or braking effort is desired by a particular train vehicle. The P signal is decoded to determine the proper motor current to generate the proper effort. In addition, there is a confirming signal, called the BRKI signal which determines when propulsion power and when braking effort is applied. The purpose of the BRKI signal is to control the power switching at the correct time to avoid one car braking while another car is in propulsion. Contact closures in the power circuitry are detected to establish that the power contacts have been made up properly and to readjust the settings in the logic. For instance, in field shunt operation, the amount of motor current is adjusted to keep from getting an undesired physical jerk of the vehicle. A failsafe reading of the P signal level is made such that, should the P signal be lost, the train control automatically goes into a brake mode. The present propulsion control apparatus determines which switches to close and when to close them to modify the power circuit properly. A dynamic brake feedback signal is sent to the mechanical brake control for providing the blending of mechanical brake necessary to maintain the deceleration level required by the P signal. The P signal is in reality a vehicle acceleration or deceleration request.

The propulsion control apparatus provides output pulses to the main power thyristors to tell them when to turn ON and when to turn OFF. When a command signal is sensed, for example, if the vehicle is in propulsion or power mode and the command signal desires the vehicle to brake, the control apparatus senses any difference between the desired motor current and the actual motor current and ramps down the actual current as required. When the current gets down to a desired level, the control apparatus opens all the propulsion switches and reconnects for a brake operation, then ramps the motor current back up again to the level established by the desired brake operation.

Figure 2:
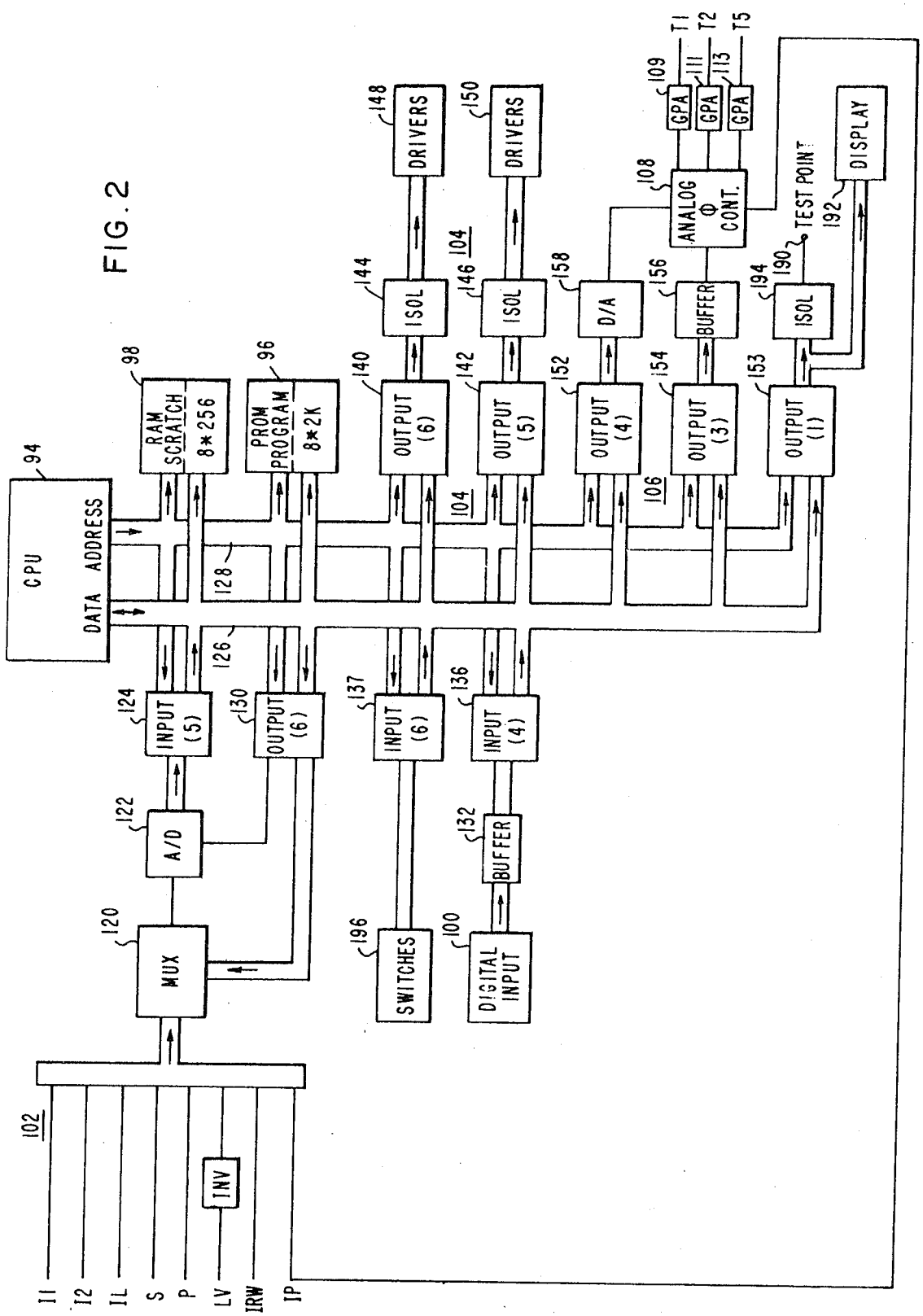
FIG. 2 illustrates the input signal operations of the present control apparatus.

In FIG. 2 there is illustrated the input signal operations and the output signal operations of the present control apparatus, including the microprocessor 94 operative with its random access memory 98 and its programmable memory 96. The analog input signals are supplied through the analog input 102, through the multiplexer 120 and analog-to-digital converter 122 and input port 124 of the microprocessor 94 operative with a data bus 126 and address bus 128. The address bus 128 and data bus 126 are operative through an output port 130 to control the multiplexer 120 and the analog-to-digital converter 122. The digital input signals are supplied through the digital input 100 operating through buffer 132 with the input port 136 operative with the data bus 126 and the address bus 128. The digital output signals are supplied through digital output 104 including output ports 140 and 142 and respective isolation circuits 144 and 146 with drivers 148 and 150 in relation to the data bus 126 and the address bus 128. The analog output 106 is operative through output ports 152 and 154 through a buffer 156 and a digital-to-analog converter 158 with the analog phase controller 108.

The central processor 94 addresses a particular input port or output port or memory location and then transmits data to or receives data from that location on the data bus 126. For example, the central processor 94 can address an input port, such as input port 124 for the analog-to-digital converter 122 and the multiplexer 120. First, it presents data to output 130 to tell the multiplexer 120 which analog circuit input signal is desired. Each analog signal has some sort of buffering, such as a differential amplifier or a low pass filter. When the particular input is addressed, the analog-to-digital converter 122 cycles for converting that data. The digital feedback signals from the digital feedback 100 come in and are read whenever desired. A monitor or display panel 192 can be provided to indicate the state of operation of the central processor 94. The output port 153 is operative through digital to analog converter and buffer amplifier 194 with the provided test point 190 and is operative with display 192. The manual switches 196 are operative with input port 137 as shown.

The P signal goes through the multiplexer 120 to request a a particular vehicle operation. The control processor 94 senses the various currents, the various voltages and the vehicle speed. It takes digital feedback signals through buffers to know what is going on in the power circuit in relation to currents and voltages. The control processor 94 provides output command signals to the power circuit. Command signals go on the data bus and output ports function as latches so the control processor 94 can proceed to do other things while each latch remembers what is on the data bus at a given address. The control processor 94 outputs a signal to close whatever power switches are desired and also outputs a requested motor current. The requested motor current is decoded in a digital-to-analog converter. The analog motor control circuit, in response to this current request, senses the actual motor current and the commutating capacitor voltage, and if everything is satisfactory, the motor control circuit appropriately fires the drivers for the chopper apparatus.

Figure 7:
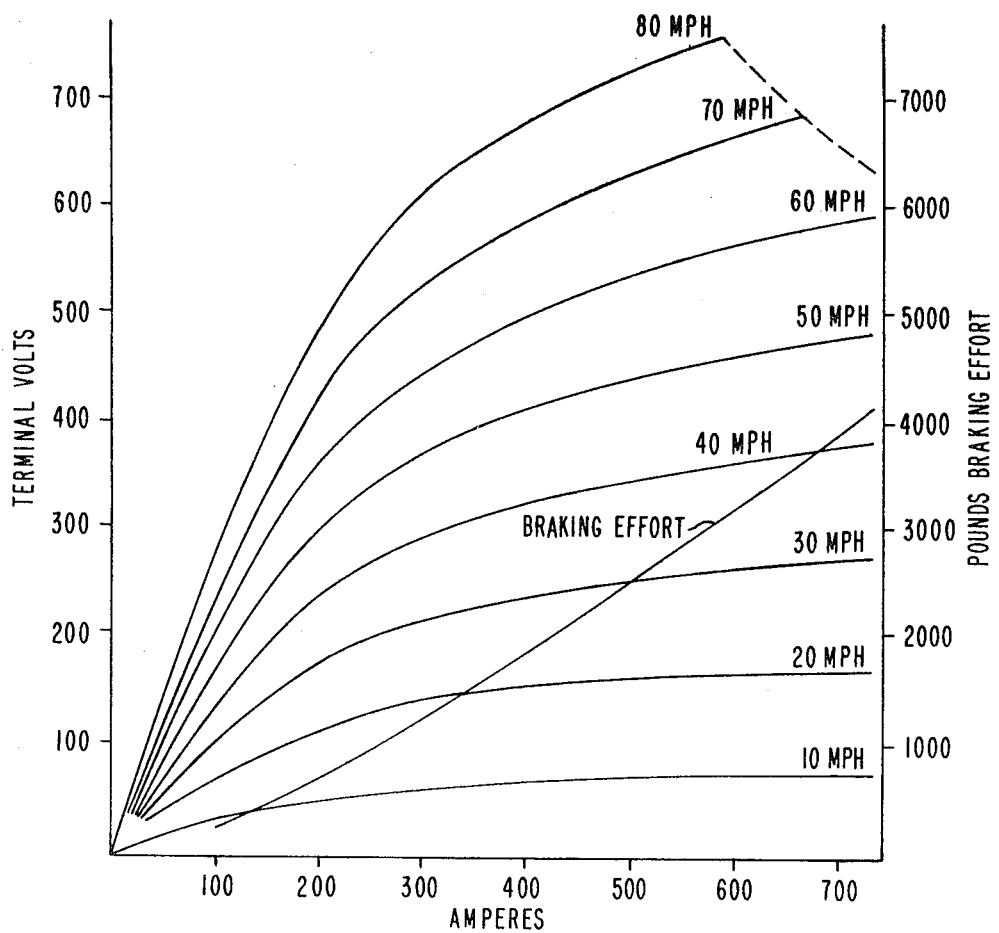
FIG. 7 shows a well known operational characteristic curve for a typical series propulsion motor operative with a train vehicle and the present control apparatus.

In relation to effort versus motor current, at up to about 100 amps, a typical series propulsion motor as shown by FIG. 7 provides little practical effort, and above 100 amps the characteristic looks more or less like a straight line. As speed increases, there is wind resistance, so the effective effort available is actually less in power, and in braking, the reverse is true. When power is requested, the motor current comes up to the level requested by the P signal at a jerk limit rate. The vehicle increases its speed because of the effort supplied. The phase increases with speed, and when the phase approaches almost 100%, the full field operation is completed and the field shunt is used to weaken the motor field, and this provides a transient response problem; a very fast controller is required, such that it can properly control the phase on the thyristors. In actual practice, propulsion power is easier to control because in power a particular phase angle sets a percentage of line volts on the motor, and this will give a particular amount of motor current, such that if the phase is set at 50%, a particular amount of current is provided in power operation for a given speed. In brake operation, this same relationship is not true since brake operation is more unstable. If the phase is held at a desired place in power operation, the motor current is stable; if a particular phase setting is held in brake operation, the motor may go to overload or to zero. If it is desired to initiate brake operation, the control apparatus has to command brake which ramps down the motor current on a jerk limit, then opens up the power switches and reconnects the power switches for brake operation; thereafter, the control apparatus goes into brake operation and ramps up the motor current to give the torque necessary to get the desired brake effort. The motor may be generated a considerable voltage that goes back into the supply line and so a resistor is put into the circuit to dissipate the excess voltage. As the vehicle comes down in speed, the motor counter EMF drops and the chopper can no longer sustain the motor current, so switches are operated to change the resistors to maintain the desired motor current. If the line voltage exceeds a particular value to indicate that the line is not receptive and will not accept the generated current, the motor current is reduced if no dynamic braking resistor is used. With dynamic resistors in the circuit, if the line voltage becomes excessive, the motor current is shunted into the dynamic braking resistor.

Figure 3B:
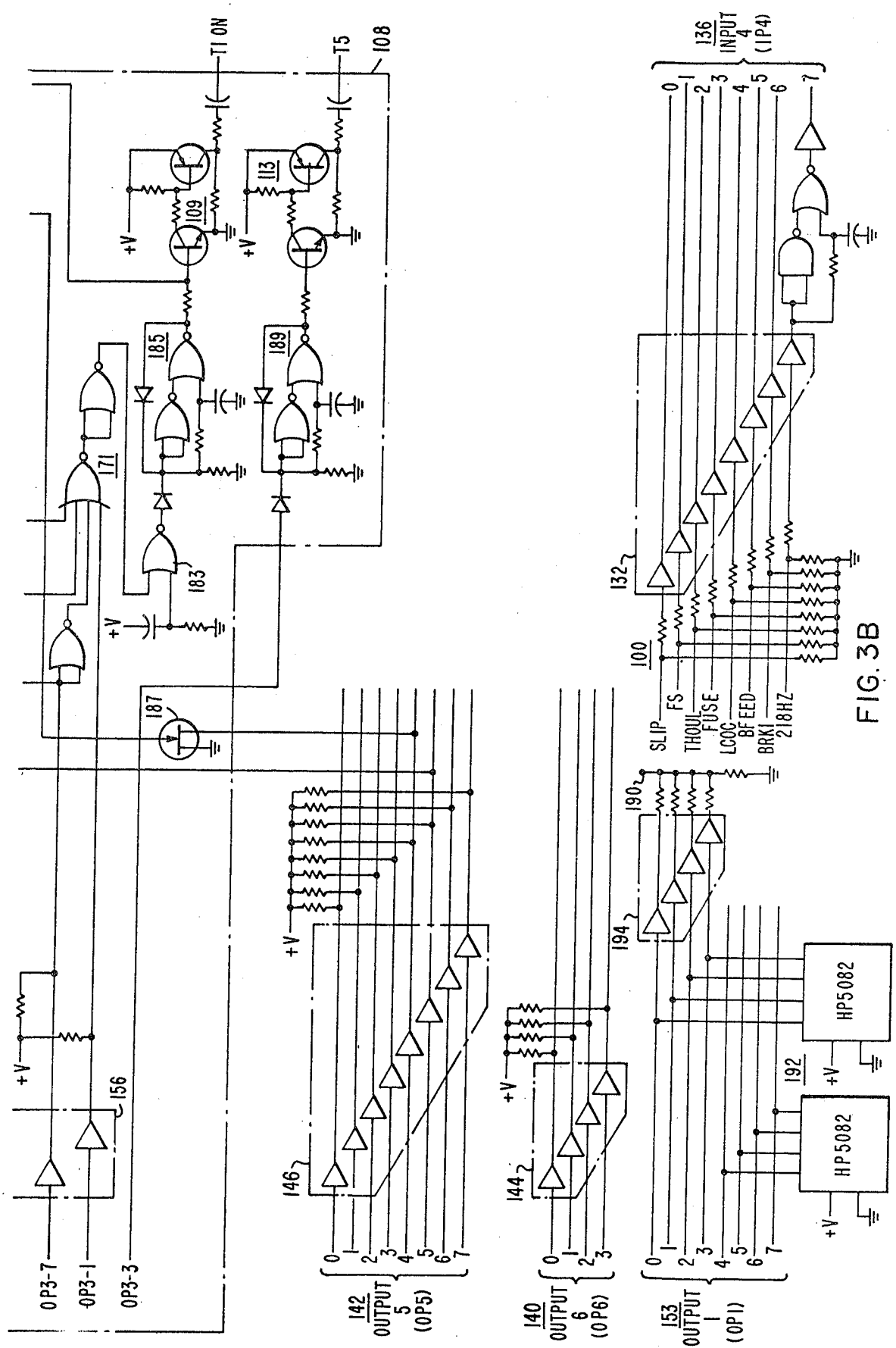

In FIGS. 3A and 3B there is schematically illustrated the provided interface of the present chopper logic control apparatus. The digital input 100 is shown in FIG. 3B operative through the buffers 132 with the input port 136. The analog input 102 is shown in FIG. 3A operative through multiplexer 120 and the analog to digital converter 122 with the input port 124 of the microprocessor. The output port 130 is operative with the register 131 to control the multiplexer 120 and the analog to digital converter 122. The output port 152 is shown in FIG. 3A operative with the digital to analog converter 158 and the analog phase controller 108; the output port 106 is shown in FIGS. 3A and 3B operative through buffer amplifiers 156 with the drivers 109, 111 and 113 for controlling the respective thyristors T1, T2 and T5. The output port 142 is shown in FIG. 3B operative with the isolation amplifiers 146. The output port 140 is shown in FIG. 3B operative with the isolation amplifiers 144. The output port 153 is shown in FIG. 3B operative with isolation amplifiers 194 and test point 190 and operative with display 192.

The pump circuit 151 operates to verify and proper working of the present control apparatus including the microprocessor 94 before the line switch is picked up and the desired propulsion motor control operation takes place. A dummy boost signal is initially put out at program line 16 to enable the line switch to be picked up, and during the main program operation if something goes wrong the boost signal disappears and the line switch drops out. The Y carrier shown in FIG. 5 has added to it the boost bit, and then time is called to wait as shown by the code sheet; the Y carrier indicates whether the OFF suppress or the ON suppress is called for.

The load weighed current request signal is output by amplifier 153. Then the buffer 155 leads to the phase controller amplifier 157, which takes the current request signal from buffer 155 and the motor current signals I1 and I2 from lines 159 and 161. The output of controller amplifier 157 is the requested OFF pulse position or the phase angle IP. The output of the amplifier 157 is compared by comparator 163 with the timing ramp from amplifier 165 which is reset by the computer every 218 Hz. The comparator 163 establishes when phase angle signal IP has exceeded the timing ramp, and this would determine at the output of comparator 163 where the OFF pulse is positioned. The logic block 167 determines whether or not the OFF pulse position output of comparator 163 is actually used. For example, if comparator 169 determines there is too much current in the system, the OFF pulse will be fired and might inhibit or suppress the ON pulse in logic block 171 which is operative with the ON pulse. The boost pulse comes from the computer and goes into the logic block 167 on line 173, and will fire an OFF pulse on the leading edge if comparator 169 has not already fired a pulse and suppress any further action out of the control system. The logic block 167 includes a flip-flop operative such that if an OFF pulse is fired once during a given program cycle, a second OFF pulse is not fired during that same program cycle. The power up restart circuit 175 suppresses pulses until the control system has time to operate properly. The circuit 177 is a monostable to assure that only a pulse is output and circuit amplifier 111 drives the OFF pulse going to the gated pulse amplifier for the thyristor T2. In power mode the FET switch 179 is closed to provide the desired motor characteristics compensation signal, and in brake mode, this switch is opened to provide a faster controller operation. The amplifier 181 checks the phase controller 157 to see if the signal IP is all the way up against the bottom stop to indicate too much current, and if so, the circuit 171 suppresses the ON pulses; this is used when starting up in power to skip ON pulses. The ON pulses are suppressed by the power up circuit 183. The ON pulses use the monostable 185 and the driver 109 as in the operation for the OFF pulse. The safety enable signal or pump circuit 151 will stop the firing of an ON pulse if repetitive boost signals are not provided. The FET switch 187 energizes the line switch output, such that if there is no activity on boost signal line 173, then the pump circuit 151 will cause FET switch 187 to keep the line switch dropped. the T5 signal comes from the computer to fire the T5 thyristor, and monostable 189 drives the driver circuit 191 going outside to the gated pulse amplifier for the T5 thyristor. The phase controller 108 includes the operational amplifier 157, with its attendant compensation for power and brake operations. The computer can force the controller 108 from output port 3-0 to zero for startup. The pumping circuit 151 checks the activity of the computer by looking at the boost line 173 for snubbing the provision of ON pulses and thereby controls the line switch. If the line switch is out, the propulsion and brake control system cannot operate the chopper apparatus, so if something is wrong, it is important to snub the ON pulses quickly, because the line switch takes time to drop out; for this reason an effect is made to stop the ON pulses when some control apparatus malfunction occurs and is sensed by the boost signals no longer being provided.

In FIG. 4 there is shown a schematic illustration of a well-known prior art motor operation control apparatus operative at the present time in Sao Paulo, Brazil, as described in the above-referenced March, 1973 published article, with series propulsion motors and including a thyristor chopper. A first pair of series motors 700 and 702 and a second pair of series motors 704 and 706 are energized in parallel from the third rail connection 708.

Figure 5:
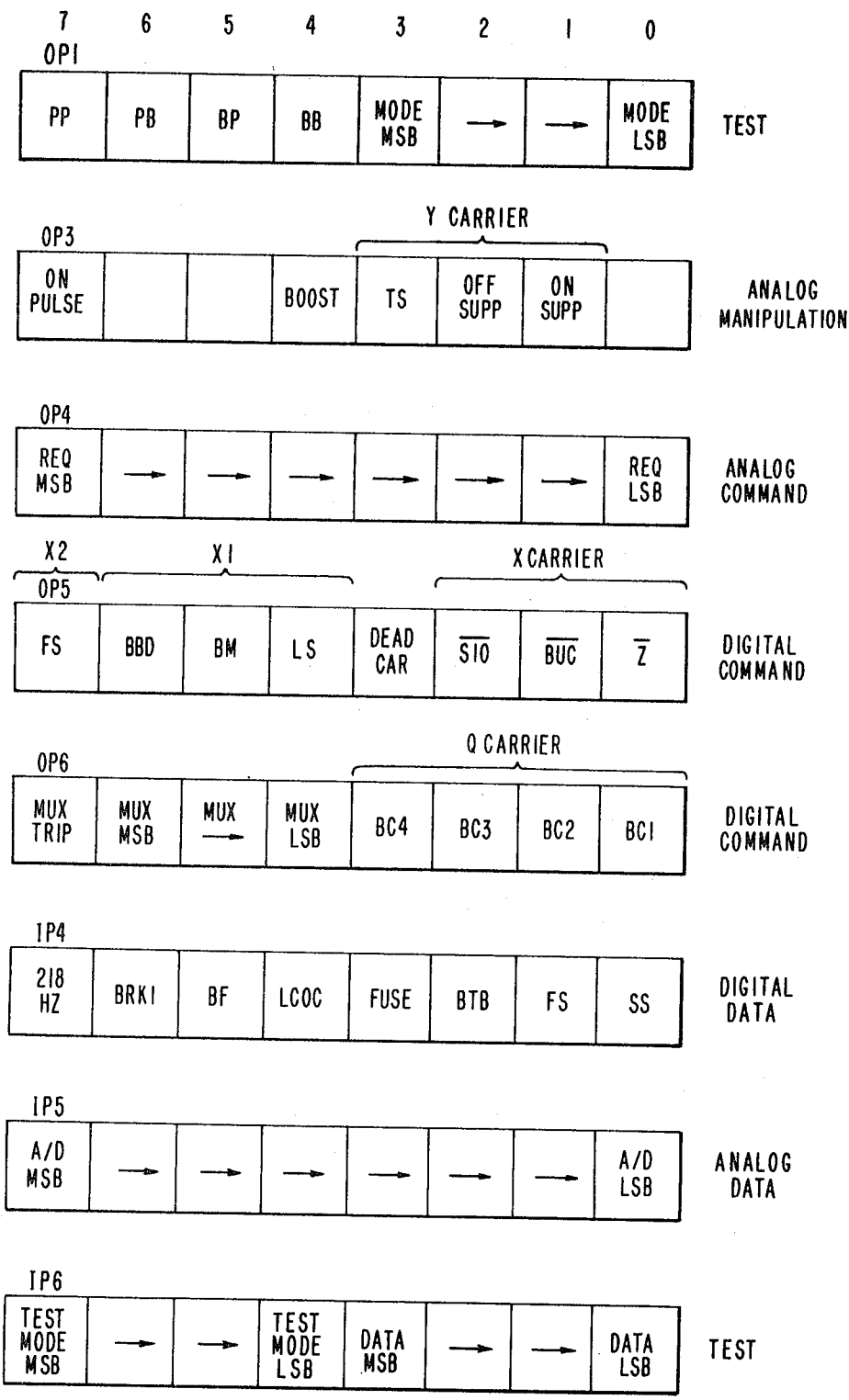
FIG. 5 illustrates the coding of the program listing included in the appendix.

FIG. 5 illustrates a code sheet that was used to develop the program listing included in the Appendix. As shown in FIG. 5 and in reference to FIG. 2, output port 1 (shown in FIG. 2 as 153) was used for a test mode, output port 3 (shown in FIG. 2 as 154) was used for analog manipulation, output port 4 (shown in FIG. 2 as 152) was used for analog command signal output, output port 5 (shown in FIG. 2 as 142) and output port 6 (shown in FIG. 2 divided into four bits each for 140 and 130) were used for digital command signal outputs, input port 4 (shown in FIG. 2 as 136) was used for digital input data, input port 5 (shown in FIG. 2 as 124) was used for analog input data and input port 6 (shown in FIG. 2 as 137) was used for test purposes in relation to manual input switches.

Figure 6:
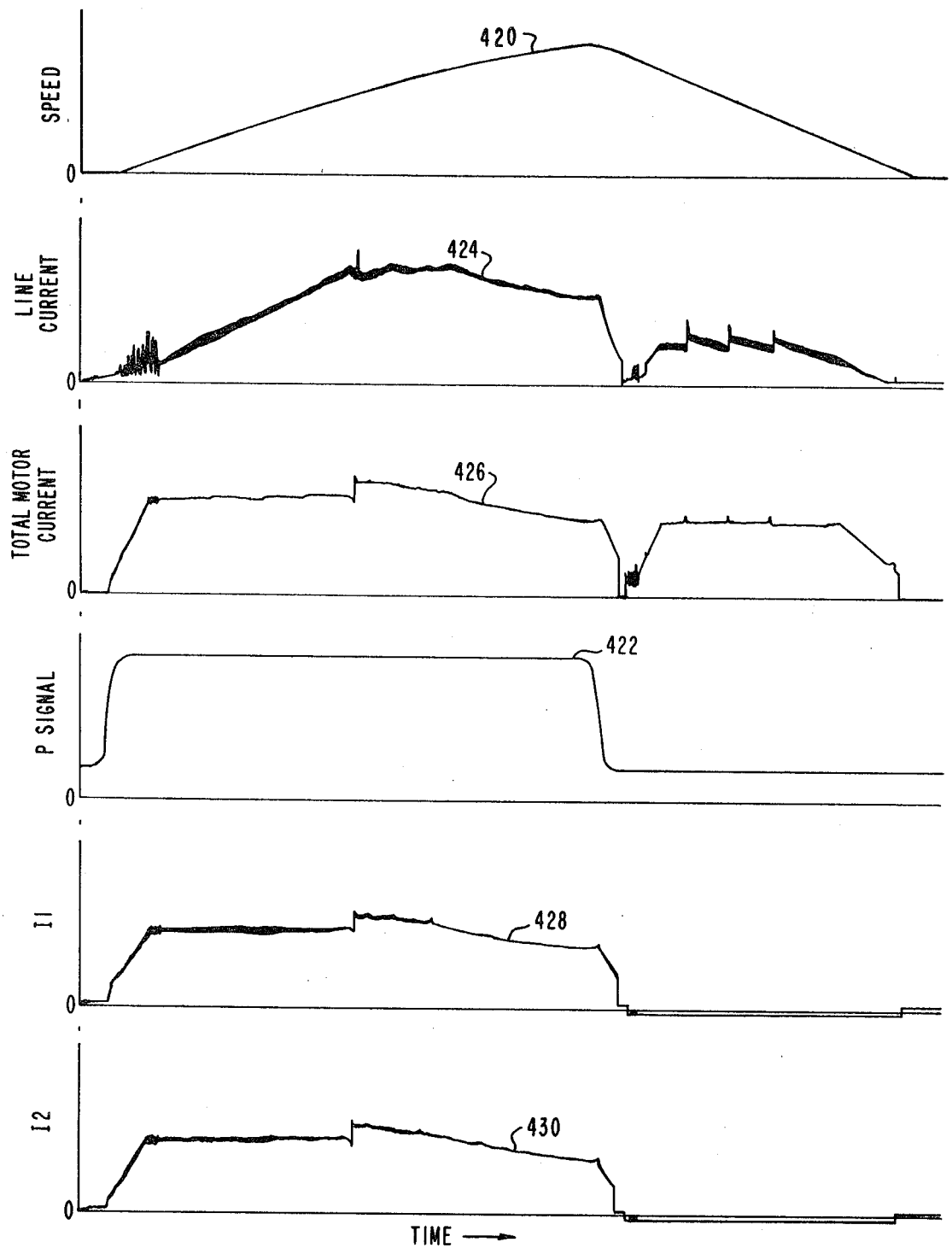
FIG. 6 shows a performance chart for an actual operation of the present control apparatus with two vehicles when both vehicles are working together in power and in brake, for a fully receptive power supply line.

In relation to the performance curves shown in FIG. 6, the two cars were operative with a receptive line are both energized in power and in brake so they were working together in effect as a single car operation. The vehicle speed S shown by curve 420, initially increases for acceleration and then decreases for deceleration in accordance with the P signal shown by the curve 422. The line current I2 is shown by the curve 424 as the train speeds up and then goes into the brake mode, the combined motor current by the curve 426 and the individual first motor current I1 by the curve 428 and the second motor current I2 by the curve 430. When the P signal changes from power mode to brake mode, the spikes on the motor current curve 426 correspond to the closing of the various braking resistor switches.

In FIG. 7 there is shown a motor characteristic for a well-known series Westinghouse traction motor of Type 1463 operative through a 5.58 to 1 gear ratio with 30 inch vehicle wheels.

Figure 8:
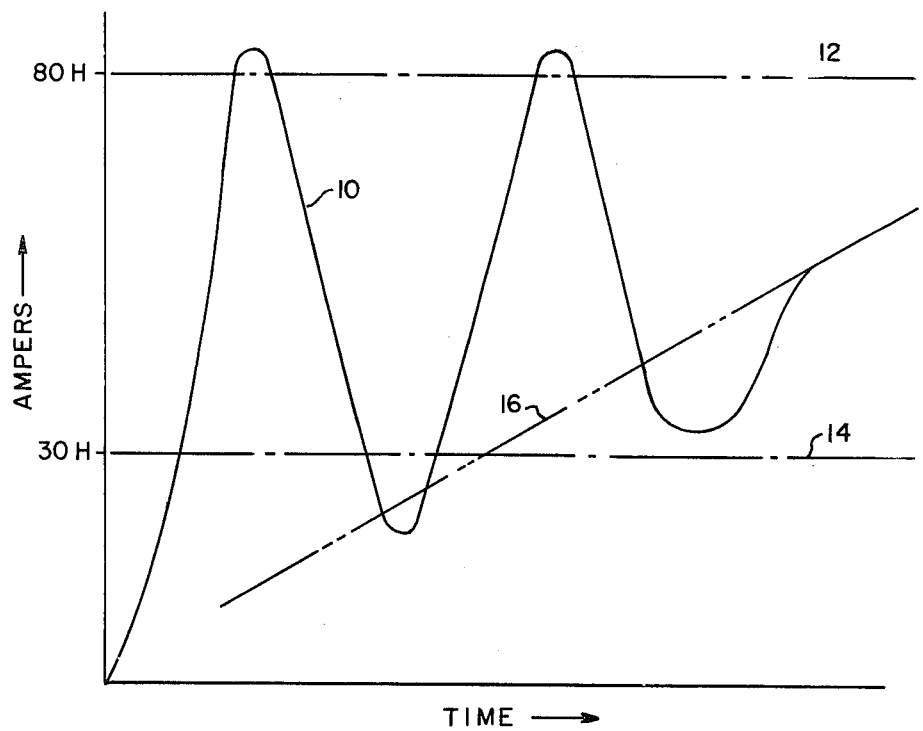
FIG. 8 shows the initial motor current portion of the regenerative braking operation provided by the present control apparatus.

In FIG. 8 there is shown the control operation provided by the present control apparatus to assure a buildup of motor current during the initial portion of the regenerative braking operation. After the motor armature current shown by curve 10 has been reversed for regenerative braking, the motor current 10 is increased above a first predetermined current limit 12, such as 80 H amperes. Thereafter, the motor current 10 is permitted to decrease to a second predetermined limit 14, such as 30 H amperes, in an effort for the brake current request 16 to assure control of the motor current above the limit 14, and this operation repeats itself as necessary for this purpose.

At program lines 152 to 156, the last part of the confirmed brake operation CYCBB is illustrated to show the technique utilized to assure brake build-up. In FIG. 6, the curve 426 shows the motor current in this regard, when the motor operation is changed to brake mode, the motor armature current is brought down to a minimum 427, and it actually goes to zero; with a series motor the motor armature current must build up in the opposite direction sufficient to provide the desired braking effort. The present control operation monitors the motor armature current during the brake mode and adjusts the motor current between two predetermined levels of motor current, for example 80 H amperes and 30 H amperes, irrespective of the brake request, and tries initially to keep the motor current above a minimum upper value of 80 H amperes. Once the motor current gets above that minimum upper limit value, then the control will allow the motor current to come down to a lower minimum limit value of 30 H amperes in an effort for the normal brake request to determine the brake effort. The control can provide continuous ON pulses to make the chopper stay ON all the time, so that if there is any voltage generated by the motor, it will initially start building the motor current up toward the upper limit in the brake direction. When the motor current goes below the lower minimum limit of 30 H amperes the control sets the minimum current limit back up to the upper limit of 80 H amperes, and then when the motor current goes above this upper limit of 80 H amperes, the control resets the minimum limit back down to 30 H amperes.

There is a little residual magnetism in the motors to develop enough voltage, and because it is a series motor the more current the more volts and the more volts the more amperes, and so forth, to in effect provide a positive feedback control situation. It is not desired for the motor current to go above 80 H amperes, because the P signal may be calling for a lower current. When the braking motor current has been above the upper limit of 80 H amperes and while it is still above 30 H amperes, the normal control operation can try to do what it wants to do, but if the current goes below 30 H amperes, then the control minimum level goes back to the upper limit of 80 H amperes again. It is generally desired to make these limits as low as practicable for reasons of the control operation, and these were established as the minimum limits for the series motors in accordance with the motor characteristics shown in FIG. 14, and under the 100 ampere current level at which some minimum braking effort becomes noticeable in relation to the practical operation of the transit vehicle as shown at 431 of the curve 426 shown in FIG. 6.

The regenerative electric brake build-up operation is shown in FIG. 8, and is provided in the program at lines 152 to 160. Program line 152 operates if the current I0 is less than 30 H to set the constant K equal to 80 H. Program line 153 operates if the current is greater than 80 H to set the constant K equal to 30 H. At program line 154 if the current is less than 80 H and Ti which is a counter timer is less than 190 H and M1 = 1 then X is incremented by two. I0 is the supply line current value that is equal to I1 + I2 from program line 48. The brake build-up contactor 781 shown in FIG. 4 operates with resistor 783 in an effort to force the field current. At program line 155, if the value of current read is less than K, the control operation then inhibits OFF pulses. When the current I0 is less than the constant K equal to 80 H, the control effort will be to increase the current I0 by inhibiting the OFF control pulses. But the first program cycle after the current I0 is greater than K equal to 80 H, then K will shift back down to 30 H, so there is a deadband effect there. The constant K is used as a decision point in relation to current I0 as to whether or not the OFF pulses will be provided or not. Until the current I0 is again less than K equal to 30 H, the normal controller operation is attempted in response to the current request signal I+ for determining the provision of OFF pulses to control the chopper apparatus. At program line 154, if the current I0 is less than 80 H, and if a timer Ti which was reinitialized is less than 190 and the operation is in the brake mode, then the brake build-up contactor 781 in FIG. 4 is closed, and when the timer Ti exceeds 190, the contactor 781 is opened.

The drive motor operation is very non-linear as shown by FIG. 7. In the high speed region up like 80 mph for a small change in current, there results a very large change in voltage. This voltage is applied in the circuit as a positive feedback kind of condition. On the other hand, for a speed of 10 or 20 mph, a fairly large change in current does not change the voltage a whole lot. So there are many problems associated with trying to regulate the current build-up as a function of speed and as a function of the current request in relation to the voltage.

In the operation of prior art brake build-up control apparatus a higher current level was built up before allowing the OFF control pulses because the speed of the controller was slower and the Hall effect current sensing devices 750 and 752 shown in FIG. 6 are faster acting than the previously employed transducter devices. In general, it is desired to maintain a minimum value of braking current before the current request signal I+ assumes command of the operation. This minimum value of current is desired in relation to the motor characteristics shown in FIG. 7, where the braking effort curve goes down to about 100 amperes of motor current, while the right-hand vertical axis shows very little contribution of practical braking effort in terms of pounds. The here provided limits of 30 H and 90 H for K are both below, this reasonably minimum practically usable value of brake effort. The curve 426 of FIG. 6 shows at 429 the operation provided by the present control operation. The full scale of curve 426 is probably in the order of 600 amperes, so there is illustrated a substantially improved control of the motor. The prior art analog control operation provided current magnitude spikes that were over half of this full scale, and this could result in a loss of the motor current because the current went up too high and it provided the rest of the circuitry an undesired opportunity to interfere with the desired current build-up.

The high speed controller and the Hall effect current sensors allow more freedom in the ability of the controller to latch on and build up the motor current as shown at 429 in FIG. 6. The provided upper limit of 80 H is predicated on the motor curves shown in FIG. 7, and it is desired not to go too far up these motor curves where practical braking effort will result. So, you want to be below 100 amperes if at all possible.

The present two-limit control operation was superior in relation to the previous analog control in that it provides a better current build-up operation since the present operation can build-up motor current to a lower level and more successfully maintain that lower level current. The present control operation can build up to 100 amperes, which is the minimum level of brake current that is normally requested, and avoids getting any appreciable braking effort. If the motor current builds up too far above this 100 amperes level on this curve as a minimal level, then appreciable pounds of braking effort are provided, and this will cause a certain negative rate of change of velocity of the transit vehicle. If the vehicle slows down at too fast of a rate, this might cause a load change and return back the control operation to power mode and regain the vehicle velocity. The lower the maximum build-up current limit and the lower the pounds of effort will permit setting more narrow limits on the speed regulation equipment and eliminate the wear-and-tear of costly changing the control operation from power to brake mode. If the vehicle is going down a very shallow grade, it is desired to apply the amount of braking effort that will just balance the grade against the vehicle weight as gravity is trying to accelerate the vehicle. Ideally, the motor brake current should be as low as practicable, and that is one of the advantages that the present control operation can provide in relation to keeping the build-up current below the minimum braking current that will likely ever be requested, and the digital microprocessor equipment permits this operation consistently. The classical Hall effect device operates such that when there is impressed a voltage across the Hall effect device and a magnetic field is applied perpendicular to it, a voltage can be measured on the opposing perpendicular faces which voltage is proportional to the magnetic field which in turn is proportional to the current providing that magnetic field. The Hall effect device has a 10 kilohertz bandwidth as compared to the prior art analog control current sensing transductors having a bandwidth of about 400 Hertz.

The high speed Hall effect devices and the high speed phase controller shown in FIG. 3 allows the phase controller to be aware of what the digital microprocessor portion of the control system is doing. When the brake current builds up to above the level of 90 H amperes and releases control to permit OFF pulses again, the phase controller has moved to some operation other than full ON or full OFF. The microprocessor provides the ON control pulses and the phase controller provides the OFF pulses. The digital microprocessor can inhibit the OFF pulses if desired independent of what the phase controller desires. The suppress OFF signal inhibits the OFF pulse and in addition there can be a suppress ON signal if desired. The actual ON pulse to the chopper thyristors can be enabled or can be disabled, but a boost pulse is provided by the microprocessor which starts a ramp for timing. The phase controller responds to this ramp and provides the OFF pulses when desired in relation to the current build-up taking place. The microprocessor provides the ON pulse position and determines the suppression of the OFF pulse, and if the microprocessor permits firing the OFF pulse, then the phase controller establishes the position of the OFF pulse. The phase controller always determines the position of the OFF pulse, and the microprocessor determines whether or not there will be an OFF pulse and whether or not there will be an ON pulse. This ties in with the 1/218 second cycle time of the program, where the clock starts and determines the cycle time of the microprocessor.

The present control operation is better able to control the regeneration braking of series transit vehicle motors. The motor current is compared with below 30 H and above 90 H amperes for setting the K number as respective decision levels, then the motor current is compared with these decision levels. The present microprocessor control operation is faster and follows better the brake request. The present Hall effect devices are so fast, that the motor current is now sensed properly in about one cycle of the program operation, and the Hall effect current sensors require the illustrated faster phase controller. The current signal builds up independent of the phase controller, with the microprocessor controlling the motor current and the phase controller follows along in response to the resulting motor current in an effort to make the motor current correspond to the brake current request signal. The Hall effect devices and the faster phase controller in combination with the microprocessor gives a significant performance advantage over the previous analog control system.

The program listing included in the Appendix is written in a language called PLM which was developed for use with the INTEL microprocessor, such as the central processor 94. This is a high level assembly language which can be compiled into machine language. The numbers used in the listing are in the hexadecimal number system, which is a base 16 number system. The first part of the listing in lines 1 to 6 is for bookkeeping purposes and identifies for the program the variables, the constants and the labels used in the course of the program. More specifically, K is an artificial constant that is set in the brake mode for controlling the brake build-up. IRW is the current request that has been load weighed to compensate for the weight of the car. I0 is the old current, I1 is one of the motor circuit currents and I2 is the other motor circuit current. IR is the current request. LVL is the line voltage. PR is the permission to regenerate. RE is the retard the effort due to a number of conditions such as overline voltage or overcurrent or the like. TI is a timer. IL is line current. LV is line voltage. M is the mode of the external equipment. M0 is the old mode and M1 is the transitory mode as determined by the mode request and the position of the power brake switch. N is a counter. PH is the phase that the external analog controller is controlling and that is brought back in to establish the field shunting. PI is the P signal that is used internally to do mode changes, PN is the new presently read P signal and P0 is the jerk limited P signal. TT is a timer. SI is the speed after the hysteresis has been applied. TOS is blank. ZI and Q are carriers to the external analog controller and establishes certain modes of operation. S is the currently read speed signal and SS is the speed signal after it has been modified for the taper on the power and brake modes. T is a timer, TP is a timer and TS is a timer. X, X1, X2, Y and Z are external controls for the analog controller. The three upper lines in the program listing are the variables used in the program. The next three lines are labels that identify in the program certain starting points where the program can jump to if needed. The compiler assigns memory locations for each variable, and any time a given variable is read, the computer knows the memory location. The mode labels are used to assign locations in the program.

The program defines the desired sequence of steps to be followed in controlling the propulsion and electric braking operation of a transit vehicle. The safe mode of operation is the brake mode. Therefore, the present control program listing always starts up through the brake mode. If an abnormal condition is detected, the program operation returns to the beginning and resequences through the brake mode. In comparison, the prior art control system shut the chopper OFF and did not try to reinitialize the equipment or to make sure the start of the operation was always from the same base.

In line 8 an mode 1 of the program an output port is directed to take a certain state, which is output port 1, and the constant Q is initialized to equal zero. In lines 9 to 14 of mode 1 the program sets the output line switch out and checks if it is satisfactory and then reads the line voltage. The program looks at the inputs, the slip slides, and so forth to see that they are in proper form and then tests for line voltage. If the line voltage at line 14 is not satisfactory, the program goes back to line 8 and the start. If the line voltage is satisfactory, a false boost signal is output at line 16 of the program because the line switch cannot be picked up until a boost is provided, so a false boost is provided for this purpose. The motors will not be energized at this time because the On and OFF pulses for the thyristors have been suppressed. If the line voltage is all right, then in line 17 of mode 2 of the program the line switch is closed for charging the commutating capacitors and a check is made at line 18 to see if all the inputs are as desired, and if they are satisfactory, the program at lines 20 and 21 initializes certain timer variables.

In line 24 of mode 3 of the program the program waits for a pulse from an external clock at 28 Hz from a crystal oscillator and when the program sees the rising edge of the clock pulse, it provides the front end of the boost to fire the ON pulse and puts the ON pulse positioner up to output the request through output port 106 shown in FIG. 3.

Lines 26 to 30 of mode 4 of the program are controlling the external analog phase controller 108 to provide a boost interval for interpreting the current signals and other things as to where the ON pulse will be and whether or not it is allowed, and providing the ON suppress and the OFF suppress.

In mode 5 lines 40 to 64, the program reads analog inputs and sets some variables. The P signal which is a linear monotonic type signal is converted to effort. When the P signal is above 60 milliamps, this is a power request, when the P signal is below 60 milliamps it is a brake request, and below 20 milliamps it is superbrake.

If the line voltage LVL is less than some predetermined number then the operator RE is set to retard the effort. In addition, a speed taper is provided whereby the speed signal S is read in the outside world and is modified so that the external speed signal SS stays at the given level as long as the external speed signal is within predetermined limits. The external speed S is the actual vehicle speed and the internal speed SS is the value that the program is using for its operations. In effect a window is put on the real vehicle speed and then used inside the program as a bracketed signal such that as the outside speed starts moving up, then the inside speed SS does not change for as long as the outside speed S is within this provided window, thereby if the outside speed S has noise interference, this provides a dead band for filtering the noise and other disturbances out of the actual speed signal S.

In lines 32 to 38 of mode 6, a determination is made to go to power or go to brake and to confirm that the control is in power or the control is in brake for the purpose of setting up the request.

Starting at line 65 of mode 7, the P signal is considered, which P signal has a value from 0 to 100, for the generation of requested effort. If the control is in power and the P signal is above 60 milliamps, this requires more effort. If the P signal is below 60 milliamps and the control is in power, this maintains a minimum effort. If the control is set in brake and the P signal is below 60 milliamps, this requests an increased brake effort down to 20 milliamps, at which time the same effort is held. If the P signal is above 60 milliamps but the BRK signal does not allow the control to go into power, a minimum brake effort is maintained. In addition, a jerk limit is provided in lines 75 to 82 of the program because the P signal can change instantly to a full 100 milliamps and must be jerk limited such that the effort signal has to increase on a ramp in one program cycle step at a time. The jerk limited P signal is incremented by one unit each program cycle to provide the desired ramp and repeatedly incrementing one at a time determines how quick the effort increases. When going into brake to prevent an abrupt fade-out of the electric motors and to permit a smoother blending of the friction brakes, a false fade-out is provided in lines 84 to 89 of the program so the electric braking fades out on a softer slope to permit the friction brakes to maintain a smooth and total braking effort.

Lnes 94 to 98 of mode 8 of the program provides a check for a zero speed when the actual speed is less than a defined amount such that the vehicle is considered to be standing still at zero speed. In addition, zero speed clears the Z carrier within the program used in a situation when there is too much current in brake, which indicates an overload and the operation should be shut down. In line 99 of the program, if the vehicle is at zero speed and a request for power is received, then the Z carrier is cleared to go back into power. A check is made at line 100 to see if the line voltage is too low, and if it is too low, the program returns to the beginning of the program since there is not enough energy for the commutating capacitor and the present control apparatus is not required to operate below a predetermined voltage level, which could mean that the vehicle is operating in a rail gap and the normal mode is to shut down the equipment when going into a rail gap. In addition in line 101 of mode 8, a check is made for excessive line voltage which is used for incrementing the RE request. If the voltage is too high, the Y carrier is set for the purpose of skipping ON pulses, and the RE request starts reducing the motor current and this reduces the line current. A check is made for LCOC which is a signal that indicates that all the power circuitry is made up properly. If any of the conditions, such as a thermal overload or a slip/slide signal or the like, indicates improper action, the effort request is reduced and a suppression of the ON pulse is effected. The Y carrier controls the ON pulse, the OFF pulse and the T5 pulse. A check is made to see if motor current I1 is greater than motor current I2 or vice versa to maintain the desired balance in the motors. A check is made at line 105 to see that I0, which is a sum of I1 and I2, is not exceeding the request IR by more than a certain amount; and if it is, the ON pulses are skipped.

The line current limit check in line 103 of mode 8 is provided to establish that the respective currents in each of the motor circuits are within a predetermined match of each other in relation to balance; if they are, the operation is satisfactory; and if not, corrective action is taken. Towing protection is provided in line 104 to enable a train vehicle to be pulled or towed; if there is a failure in the external equipment of a given vehicle, it is desired that this be recognized and the vehicle operated such that the other operating cars in the train can tow the disabled vehicle.

In lines 110 to 113 of mode 9 of the program the current request is generated from the PR signal from which the retard effort RE is subtracted to get the IR request signal, and a speed tilt is provided in relation to a power mode or brake mode of operation to change the current request IR on the field shunt and check of the inputs. The effort request is the modified P signal which has been modified, then a speed tilt is added to the modified P signal by looking at the speed and tilting the P signal plus when power operation is desired and tilting the P signal negative for brake operation. The speed tilt is provided in lines 114 and 115 by chopping off a little bit of the requested current to compensate for the effort required to maintain acceleration as speed increases; in effect, the requested current is added to or subtracted from, depending upon whether the control is in power or in brake, and this adds or subtracts an increment of vehicle speed. In this regard, during brake, the motor is dragging and the car is dragging, so less effort is needed from the motor current because the drag is additive; however, in power operation, the drag is against the propulsion effort, so additional motor current and effort is provided to compensate for the needed extra power to properly operate the vehicle. The provided speed tilt accomplishes this function in relation to the speed of the vehicle. For the change of the current request on field shunt in lines 116 to 118, if in field shunt operation, then the motor characteristics are different; the field shunt is field weakening, and there is a different current level needed to get the desired motor torque. The input check is provided at lines 120 to 123 to make sure that all the switches and so forth are set where they should be. The input 4 relates to the temperature of the semiconductors; this temperature in the prior art was sensed and if too high was previously used to shut everything down as an irrevocable control move. In the present system, restarting of the program is permitted after a too high semiconductor temperature is sensed. Input 4 is presently checked to see if the temperature is not too high, if it is satisfactory the ON pulse for the chopper is allowed, and the incremental loop timer goes to mode 10. If the semiconductor temperature is too high, the program goes to mode 10 and if necessary, a T5 pulse is fired; for a given cycle of program operation, it may be desired to cancel the ON pulse for that cycle or suppress the OFF pulse or shut off the T5 pulse, or even to turn on the T5, depending on what is desired. If the semi-conductor temperature in the next cycle is back to a desired level, the program continues as normal to avoid a total shut-down and permit the transit vehicle to continue running. The present control provides a lessening of the provided effort to permit the equipment to continue running within capabilities and contributing some partial desired effort to the train movement.

Mode 10 of the program includes four selectable control operations—namely, CYCPP which is confirmed power, CYCBB which is confirmed brake, CYCBP which is cycling from brake to power, and CYCPB which is cycling from power to brake. These relate to differences in the desired vehicle control as to when a particular control is desired and what kind of control is desired. More specifically, for the first control operation of CYCPP which is confirmed power, it is desired to stay in power and to confirm that the control is presently in power; the field shunt is closed in lines 129 to 132 in relation to phase angle and the line voltage is cut back in line 134 in relation to low voltage. The close of the field shunt is provided to increase the train speed. To keep the current flowing in the motor, it is necessary to keep turning the chopper ON for longer periods of time to keep increasing the percentage of voltage to counteract the counter EMF of the motor. At some control point, it is desired to move to field weakening, and the control approach taken here senses the chopper being ON for 95% of the time and field weakening is then provided.

In the second operation of CYCBB which is confirmed brake, the request is to be in brake and the control operation is confirmed to be already in brake. This portion of the program permits improved control in the braking mode in relation to regeneration of power, wherein a sequence of control steps is provided in lines 147 to 151 taking progressively stronger action if the line voltage gets beyond defined limits in an effort to control the maximum level of line voltage. If the line voltage starts getting above a predetermined first limit CE, then the request is cut back by two; if the line voltage gets above a predetermined second limit D4, then the previous action has added to it a stronger reduction and so forth through greater predetermined limits to effect progressively increased current reductions due to excess line volts by suppressing ON pulses for the chopper to provide this current reduction.

A hysteresis for brake build-up is provided at lines 152 to 156 by trying to get at least a minimum predetermined current level in the brake mode after the motor armature current has been reversed for braking; this portion of the program provides the requested brake effort in conjunction with a minimum effort to assure an adequate brake current. The problem is to assure after the propulsion motors are established in the proper way to start generating brake current, that the armature current is built up in time to prevent loss of the armature current because when changing from power to electric braking, the braking armature current results from the residual magnetism left over in the field circuits of the motor. If the control apparatus does not operate fast enough and lets this residual magnetism go to zero, the armature current will not build up. In relation to a contribution to regenerative braking or electrical braking, the present control apparatus enables a build-up of brake current after going to the brake mode, such that when the build up contactor is closed thereafter only ON pulses are provided with a defeat of OFF pulses until a minimum armature current is present in an effort to assure that the armature current gets started as quickly as it can be before there occurs a loss of the residual field magnetism. The propulsion motor is a series motor, so the armature and field windings are in series. After cutting the armature current to go into a brake operation, it takes a while for the field to be reenergized and this is the residual magnetism that is involved in this operation; the armature circuit is reversed for brake operation, but the field does not go to zero instantly because of residual magnetism. When it is desired to go into the brake mode of operation, the program maintains a minimum level of current in the brake mode and permits the armature current build-up in the opposite direction to an adequate level to maintain the field magnetism and still reverse the current flow in the armature; the control operation desires a current above a certain value and assures that at last this value of armature current is maintained.

```
0F0H:

1        DECLARE (K, IRW, I0,I1,I2,IR,LVL,PR,RE,TI) ADDRESS;

2        DECLARE (IL,LV,M,M0,M1,N,PH,PI,PN,P0,TT) BYTE;

3        DECLARE (S1, T0S, Z1, Q,S,SS,T,TP,TS,X,X1,X2,Y,Z) BYTE;

4        DECLARE (MODE1,MODE2,MODE3,MODE4,MODE5) LABEL;

5        DECLARE (MODE6,MODE7,MODE8,MODE9,MODE10) LABEL;

6        DECLARE (MODE11,CYCPP,CYCBB,CYCPB,CYCBP) LABEL;

7        GO TO MODE1;

8   100H: MODE1: OUTPUT(1)=0F1H; Q=0;

9        OUTPUT(5)=24H;

10       IF (INPUT(4) AND 3FH) <> 12H THEN GO TO MODE1;

11       OUTPUT(6)=0B0H+Q; OUTPUT(6)=Q;
```

```
12      OUTPUT(3)=86H; OUTPUT(4)=00H;
13      LV=INPUT(5);
14      IF LV<76H THEN GO TO MODE1;
15      GO TO MODE2;

16 140H: MODE2: OUTPUT(1)=0F2H; OUTPUT(3)=14H;
17      OUTPUT(5)=34H; OUTPUT(3)=04H;
18      IF (INPUT(4) AND 3FH) <> 02H THEN GO TO MODE2;
19      OUTPUT(3)=82H; OUTPUT(3)=02H;
20      M=0; M1=0; N=0; P0=00H; RE=2; TI=0; T=0;
21      TP=2; TS=0; Y=02H; Z=1;
22      GO TO MODE3;

23 1C0H: MODE3: OUTPUT(1)=0F3H;
24      IF (INPUT(4) AND 80H) =80H THEN GO TO MODE3;
25      GO TO MODE4;

26 200H: MODE4: OUTPUT(1)=0F4H;
27      OUTPUT(3)=(10H+(Y AND 0F7H));      CALL TIME(4);
28      OUTPUT(3)=90H+Y; OUTPUT(4)=SHR(IR,1);
29      OUTPUT(3)=10H+Y; CALL TIME(4);
30      OUTPUT(3)=Y;
31      GO TO MODE5;

32 260H: MODE6: OUTPUT(1)=0F6H;
33      IF (INPUT(4) AND 40H)=00H  AND TS>0F0H AND Z=1 THEN DO;
34        M=1; TS=0; END;
35      IF (INPUT(4) AND 40H)=40H  THEN M=0;
36      IF TS>0F4H THEN TS=0F4H;
37      IF (INPUT(4) AND 20H)=00H  THEN M0=0; ELSE M0=1;
38      IF S>0FDH THEN M=0;
39      GO TO MODE7;

40 300H: MODE5: OUTPUT(1)=0F5H;
41      OUTPUT(6)=080H+Q; OUTPUT(6)=Q;
42      N=N+1;
```

```
43      I1=INPUT(5);
44      OUTPUT(6)=090H+Q; OUTPUT(6)=Q;
45      SS=SHR(S,3);
46      I2=INPUT(5);
47      OUTPUT(6)=0A0H+Q; OUTPUT(6)=Q;
48      I0=I1+I2;
49      IL=INPUT(5);
50      OUTPUT(6)=0B0H+Q; OUTPUT(6)=Q;
51      OUTPUT(6)=Q; OUTPUT(6)=Q;
52      LV=INPUT(5);
53      OUTPUT(6)=0C0H+Q; OUTPUT(6)=Q;
54      LVL=LV;
55      LVL=LVL+LVL+LVL;
56      S1=INPUT(5);
57      OUTPUT(6)=0D0H+Q; OUTPUT(6)=Q;
58      OUTPUT(6)=Q; OUTPUT(6)=Q;
59      PN=INPUT(5);
60      OUTPUT(6)=0E0H+Q; OUTPUT(6)=Q; OUTPUT(6)=Q; OUTPUT(6)=Q;
61      PH=INPUT(5);
62      OUTPUT(6)=0F0H+Q; OUTPUT(6)=Q; OUTPUT(6)=Q; OUTPUT(6)=Q;
63      IRW=INPUT(5); IRW=IRW+IRW+IRW+IRW;
64      GO TO MODE6;

65  400H: MODE7: OUTPUT(1)=0F7H;
66      IF PN<96H THEN PI=99H-PN;
67      IF PN>9CH THEN PI=PN-99H;
68      IF PN<9EH AND PN>94H THEN PI=0;
69      IF PN<96H AND M=1 THEN PI=0;
70      IF PN>9CH AND M=0 THEN PI=0;
71      IF PI>66H THEN PI=66H;
72      IF PN<26H THEN DO;
73         PI=66H; M=0; END;
74      IF M=1 THEN PI=PI+SHR(PI,2);
75      IF N>3 THEN DO;
76         N=0; IF LV<0C8H THEN RE=RE-1;
77         IF (M+M0=1) THEN DO;
```

```
78              T=T+1; P0=P0-1; END;
79          ELSE DO;
80             IF IRW>(I0+24H) THEN P0=P0-2;
81             IF P1>P0+1 THEN P0=P0+1;
82             IF P1<P0-1 THEN P0=P0-1; END;
83          END;
84       IF M0=0 THEN DO;
85          IF S<60H AND S>10H THEN DO;
86             IF P0>(S+3-20H) THEN P0=(S+3-20H);
87             END;
88          IF S<11H THEN P0=04H;
89          END;
90       IF P0<4 THEN P0=4;
91       IF S1>S+3 THEN S=S+1;
92       IF S>S1+3 THEN S=S-1;
93       GO TO MODE8;

94  580H: MODE8: OUTPUT(1)=0F8H;
95       IF S<09H THEN DO;
96          X=04H; IF M0=0   THEN Z=1; END;
97          ELSE X=05H;
98       IF S>33H THEN X=01H;
99       IF Z=1 THEN Y=00; ELSE DO; P0=4;  GO TO MODE11; END;
100      IF LV<6EH THEN GO TO MODE1;
101         IF IL>0C7H THEN RE=RE+2;
102         IF RE<2 THEN RE=2; IF RE+1>PR THEN RE=PR-1;
103         IF I1>I2+30H THEN Y=02H; IF I2>I1+30H THEN Y=02H;
104         IF I0>40H THEN M1=M0;
105         IF I0>IRW+0C0H THEN Y=02H;
106         IF (I0>IRW+100H) OR (I0>2F0H) THEN DO;
107            Q=0; X1=X1+30H; Y=02H; X2=00; P0=02H; IR=00H; Z=0;
108            GO TO MODE11; END;
109         GO TO MODE9;

110  720H: MODE9: OUTPUT(1)=0F9H;
111         PR=P0;
112         PR=PR+PR+PR+2FH;
```

```
113        IR=PR-RE;
114        IF (SS<IR AND M0=0) THEN IR=IR-SS;
115        IF M0=1 THEN IR=IR+SS;
116        IF (INPUT(4) AND 02H)=00H THEN IR=IR+49H;
117        IF IR>1FFH THEN IR=1FFH;
118        IF IR<49H THEN IR=49H;
119        IF (INPUT(4) AND 10H) <> 00 THEN TT=0;
120        IF TT<06H THEN DO;        P0=4; Y=03H; END; ELSE DO;
121   .    TT=70H; END;
122        IF (INPUT(4) AND 08H)=08H THEN Y=0BH;
123        TT=TT+1;
124        GO TO MODE10;

125  800H: MODE10: OUTPUT(1)=0FAH;
126    CYCPP: IF M=1 AND M0=1 THEN DO;
127           OUTPUT(1)=8AH; Q=0; TI=0; T=0; X1=10H;
128        IF PH>0E5H THEN DO;
129           TP=TP+1; IF TP>13H THEN TP=13H;
130           IF TP>10H THEN X2=80H; END;
131        IF PH<0D0H THEN DO;
132           TP=TP-1; IF TP<2 THEN TP=2;
133           END;
134        IF IRW>LVL THEN RE=RE+2;
135        GO TO MODE11;
136        END;

137    CYCBB: IF M=0 AND M0=0 THEN DO;
138           OUTPUT(1)=1AH; T=0;
139    !      TS=TS+1; TP=2; TI=TI+1; IF TI>200H THEN TI=200H;
140           X1=30H; X2=00H; T=0; Q=00H;
141           IF S>009H THEN Q=0FH;
142           IF S<1AH THEN DO; Y=02H; IR=0; GO TO MODE11; END;
143           IF S>78H THEN Q=07H;
144           IF S>96H THEN Q=03H;
145           IF S>0B4H THEN Q=01H;
146           IF S>0D3H THEN Q=00H;
147        IF LV>0CEH THEN RE=RE+2;
```

```
148        IF LV>0D4H THEN RE=RE+3;
149        IF LV>0DAH THEN RE=RE+4;
150        IF LV>0E0H THEN RE=RE+5;
151        IF LV>0E6H THEN Y=02H;
152         IF I0<30H THEN K=030H;
153        IF I0>80H THEN K=30H;
154        IF I0<80H AND TI<190H AND M1=1 THEN X=X+2;
155        IF I0<K   THEN DO; Y=Y+04H; TOS=0; END; ELSE DO;
156           TOS=TOS+1; IF TOS<2 THEN Y=Y+04H; IF TOS>8 THEN TOS=8; END;
157        IF LV>0FDH THEN Z1=1;
158        IF Z1=1 THEN DO;
159           X1=70H; Q=0; Y=0AH;        IR=2; END;
160        GO TO MODE11; END;

161   CYCBP: IF M=0 AND M0=1 THEN DO;
162        OUTPUT(1)=4AH; TS=TS+1; TI=0;
163        IF ((INPUT(4) AND 02H) =02H) AND (IR<99H) THEN Y=02H;
164        IF IR<50H THEN Y=02;
165        IF P0<5 AND ((I0<3FH) OR (T>0F0H)) THEN DO;
166           X1=30H; X2=00H; END;
167        GO TO MODE11; END;

168   CYCPB: IF M=1 AND M0=0 THEN DO;
169        OUTPUT(1)=2AH; TP=2;
170        Z1=0;
171        IF IR<50H THEN Y=02;
172        IF P0<5 AND ((I0<3FH) OR (T>0F0H)) THEN DO;
173           X1=10H; X2=00H; END;
174        IF (T>0D8H) AND (I0>3FH) THEN DO;
175           X1=50H; X2=00H;END;
176        GO TO MODE11; END;
177   OACOH: MODE11: OUTPUT(1)=0BH;
178        OUTPUT(5)=(X+X1+X2);
179           GO TO MODE3;

180        EOF;
```

We claim:

1. In control apparatus for a chopper responsive to a brake effort request signal for determining an ON operation and an OFF operation and being operative with a transit vehicle electric motor having a known brake effort characteristic for determining the brake effort provided by said electric motor, the combination of:
   means responsive to the actual current of the motor,
   means for establishing an upper motor current limit in relation to said brake effort characteristic and establishing a lower motor current limit in relation to the provision of said motor current, and
   means operative with said actual motor current for making a first comparison of the actual motor current with said upper limit to determine the ON operation of the chopper until the actual motor current is greater than said upper limit and making a second comparison of the actual motor current with said lower limit to permit the OFF operation of the chopper in response to the brake effort request signal.

2. The control apparatus of claim 1, with at least one of said upper motor current limit and said lower motor current limit being below the normally practical minimum brake effort current level of said motor.

3. The control apparatus of claim 1, with both of said upper motor current limit and said lower motor current limit being below the normally practical minimum brake effort current level of said motor.

4. The control apparatus of claim 1, with said comparison making means being operative to successively first operate with the upper limit and then the lower limit followed by operating with the upper limit and then the lower limit until the brake effort request signal becomes operative to maintain said actual motor current.

5. The control apparatus of claim 1, with said ON operation being effective to increase said actual motor current above the upper limit and with said OFF operation being effective to decrease said actual motor current below the lower limit.

6. In the method of controlling in response to a brake effort request signal the brake effort provided by a transit vehicle electric motor connected for operation with a chopper having an ON operation and an OFF operation, the steps of:
   responding to the actual current of the motor,
   establishing an upper current limit and a lower current limit below the normally practical minimum brake effort current level of said motor,
   comparing said actual current with the upper current limit when said actual current is below said lower current limit to determine the ON operation of the chopper, and
   comparing said actual current with the lower current limit when said actual current is above said upper current limit to determine the OFF operation of the chopper.

7. The method of claim 6,
   with said step of comparing the actual current with the upper current limit continuing until the actual current is greater than the upper limit, and
   with said step of comparing the actual current with the lower current limit continuing until the actual current is less than the lower current limit.

8. The method of claim 6,
   with the ON operation being effective to increase the actual current and with the OFF operation being effective to decrease the actual current.

9. In control apparatus for a chopper responsive to a brake effort request signal for determining an ON operation and an OFF operation and being operative with a transit vehicle electric motor having a known brake effort characteristic for determining the brake effort provided by said electric motor, the combination of:
   means responsive to the actual current of the motor for each of successive predetermined time intervals,
   means for establishing an upper motor current limit in relation to said brake effort characteristic and establishing a lower motor current limit in relation to said actual motor current,
   means operative for each of said time intervals with said actual motor current for making a first comparison of the actual motor current with said upper limit to determine the ON operation of the chopper until the actual motor current is greater than said upper limit and for making a second comparison of the actual motor current with said lower limit to permit the OFF operation of the chopper in response to the brake effort request signal, and
   means for determining for each of said time intervals the relationship of the ON and the OFF operation of said chopper to establish said actual current of the motor in response to said brake effort request signal.

10. The control apparatus of claim 9, with said comparison making means being operative for a first plurality of said time intervals with the upper limit and then being operative for a second plurality of said time intervals with the lower limit followed by operating with the upper limit and then the lower limit until the brake effort request signal becomes operative to maintain said actual motor current.

11. In the method of controlling in response to a brake effort request signal the brake effort provided by a transit vehicle electric motor connected for operation with a chopper having an ON operation and an OFF operation, comprising the steps of:
    sensing the actual current of the motor for each of successive predetermined time intervals,
    establishing an upper current limit and a lower current limit below a normal minimum brake effort current level of said motor,
    comparing for each of said time intervals said actual current with the upper current limit when said actual current is below said lower current limit to determine the ON operation of the chopper, comparing for each of said time intervals said actual current with the lower current limit when said actual current is above said upper current limit to determine the OFF operation of the chopper, and
    controlling the actual current of said motor for each of said time intervals by the determined ON operation and OFF operation of the chopper.

* * * * *